US010421319B2

(12) United States Patent
Gaylo et al.

(10) Patent No.: US 10,421,319 B2
(45) Date of Patent: Sep. 24, 2019

(54) NON-PNEUMATIC TIRE WITH INTEGRATED POLYMERIC FLEXIBLE WHEEL CENTER MOUNT

(71) Applicants: Compagnie Generale des Etablissements Michelin, Clermont-Ferrand (FR); Michelin Recherche et Technique S.A., Granges-Paccot (CH); Ryan Michael Gaylo, Simpsonville, SC (US); Timothy Rhyne, Greenville, SC (US); Steven Cron, Simpsonville, SC (US)

(72) Inventors: Ryan Michael Gaylo, Simpsonville, SC (US); Timothy Rhyne, Greenville, SC (US); Steven Cron, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 117 days.

(21) Appl. No.: 15/536,294

(22) PCT Filed: Dec. 8, 2015

(86) PCT No.: PCT/US2015/064426
§ 371 (c)(1),
(2) Date: Jun. 15, 2017

(87) PCT Pub. No.: WO2016/100004
PCT Pub. Date: Jun. 23, 2016

(65) Prior Publication Data
US 2017/0368877 A1 Dec. 28, 2017

Related U.S. Application Data

(63) Continuation of application No. PCT/US2014/070812, filed on Dec. 17, 2014.

(51) Int. Cl.
*B60C 7/14* (2006.01)
*B60C 7/24* (2006.01)
(Continued)

(52) U.S. Cl.
CPC .................. *B60C 7/14* (2013.01); *B60C 7/24* (2013.01); *B60C 7/26* (2013.01); *B60C 2001/0091* (2013.01); *B60C 2007/146* (2013.01)

(58) Field of Classification Search
CPC .... B60C 7/14; B60C 7/16; B60C 7/18; B60C 7/24; B60C 2007/146; B60C 2007/107
See application file for complete search history.

(56) References Cited

U.S. PATENT DOCUMENTS 4,669,964 A   6/1987   Amano
4,832,098 A   5/1989   Palinkas
(Continued)

FOREIGN PATENT DOCUMENTS

CN   103009909 A   4/2013
EP   2955009 A1   12/2015
(Continued)

OTHER PUBLICATIONS

International Search Report for PCT/US2014/070812 dated Mar. 31, 2015.
(Continued)

*Primary Examiner* — Kip T Kotter
(74) *Attorney, Agent, or Firm* — Dority & Manning, P.A.

(57) ABSTRACT

A structurally supported, non-pneumatic wheel is provided. The wheel includes a hub constructed from a polymeric material, which can more readily resist deformation during an impact event and provide improvements in noise genera-
(Continued)

tion and manufacturing cost. A plurality of tension-transmitting web elements connect the hub with a compliant, load supporting band.

17 Claims, 6 Drawing Sheets

(51) Int. Cl.
*B60C 7/26* (2006.01)
*B60C 1/00* (2006.01)

(56) References Cited

U.S. PATENT DOCUMENTS

| | | | |
|---|---|---|---|
| 4,945,962 A | 8/1990 | Pajtas | |
| 5,645,870 A | 7/1997 | Larsen | |
| 7,201,194 B2* | 4/2007 | Rhyne | B60B 9/04 152/11 |
| 8,567,461 B2* | 10/2013 | Williams | B60C 7/18 152/30 |
| 9,248,697 B2* | 2/2016 | Iwamura | B60B 1/06 |
| 9,616,703 B2* | 4/2017 | Nishida | B60B 9/04 |
| 2004/0159385 A1 | 8/2004 | Rhyne | |
| 2004/0187996 A1 | 9/2004 | Grah | |
| 2008/0073014 A1 | 3/2008 | Abe | |
| 2009/0107596 A1 | 4/2009 | Palinkas | |
| 2010/0200131 A1 | 8/2010 | Iwase | |
| 2011/0024008 A1 | 2/2011 | Manesh | |
| 2012/0038206 A1 | 2/2012 | Chadwick | |
| 2012/0205017 A1 | 8/2012 | Endicott | |
| 2012/0234445 A1 | 9/2012 | Manesh | |
| 2013/0209595 A1 | 8/2013 | Speck | |
| 2013/0284329 A1 | 10/2013 | Wilson | |
| 2013/0287882 A1 | 10/2013 | Wilson | |
| 2014/0034219 A1 | 2/2014 | Chadwick et al. | |
| 2014/0070439 A1 | 3/2014 | Martin | |
| 2014/0083581 A1 | 3/2014 | Schaedler et al. | |
| 2014/0159280 A1 | 6/2014 | Martin et al. | |
| 2014/0251518 A1* | 9/2014 | Abe | B60B 9/04 152/75 |

FOREIGN PATENT DOCUMENTS

| | | |
|---|---|---|
| WO | WO 2005/063505 A1 | 7/2005 |
| WO | WO 2012/030519 A2 | 3/2012 |
| WO | WO 2013/130047 | 9/2013 |
| WO | WO2016/100005 A1 | 6/2016 |
| WO | WO2016/100006 A1 | 6/2016 |

OTHER PUBLICATIONS

International Search Report for PCT/US15/64426 dated Feb. 2, 2016.
International Search Report for PCT/US15/64428 dated Apr. 21, 2016.
International Search Report for PCT/US15/64433 dated Feb. 16, 2016.
International Search Report for PCT/US14/070784 dated Apr. 1, 2015.
International Search Report for PCT/US14/070796 dated Mar. 31, 2015.

* cited by examiner

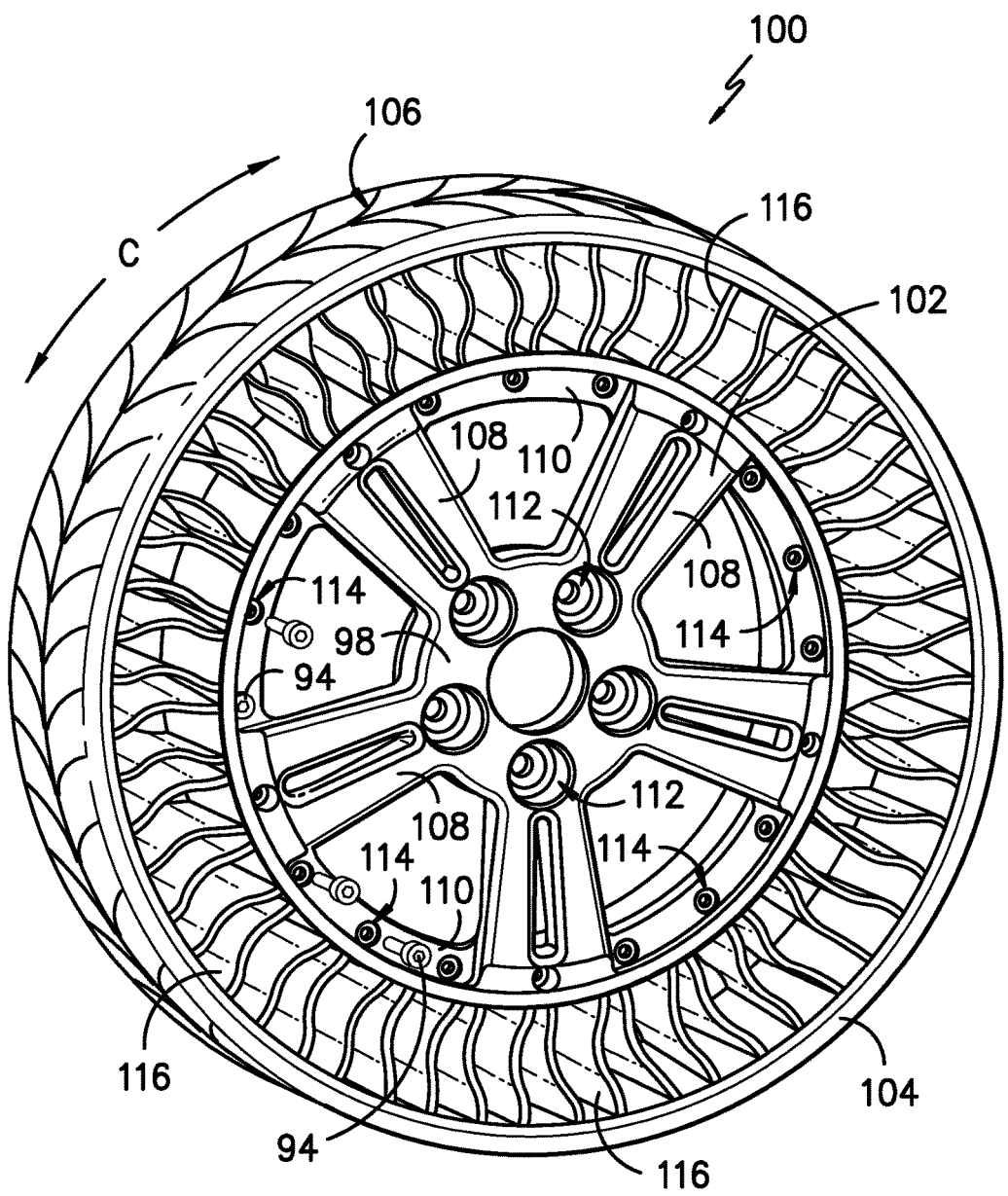
FIG. -1-

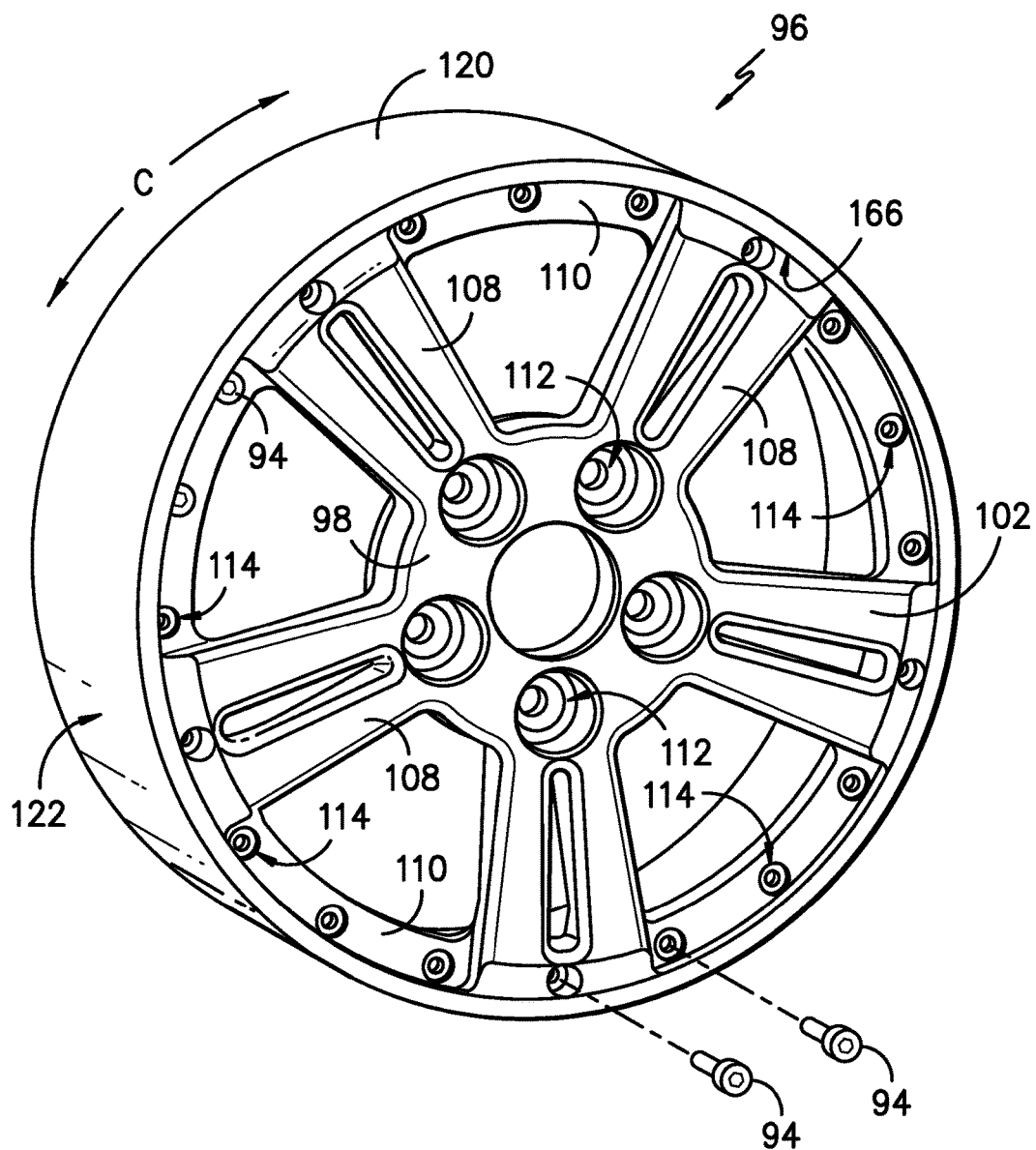
FIG. -2-

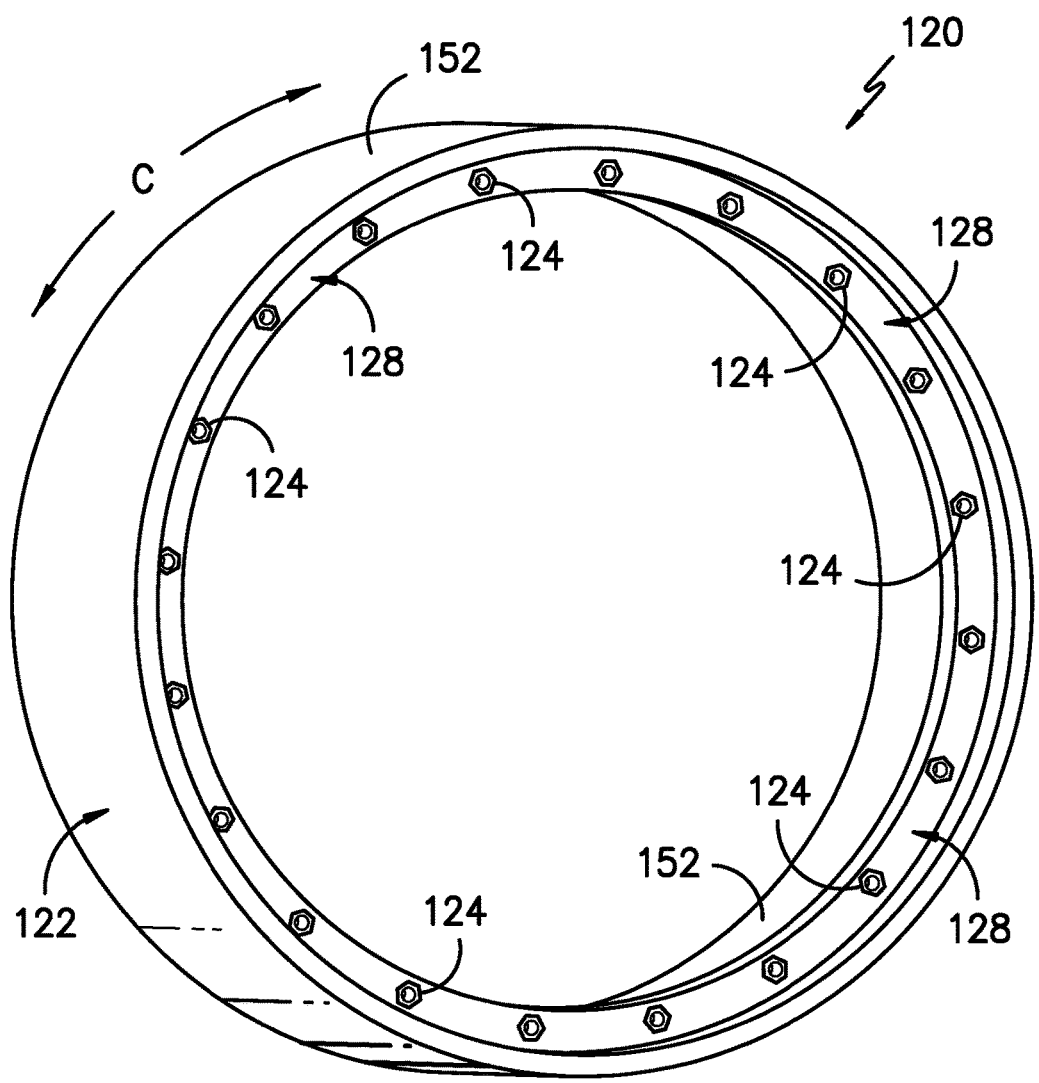
FIG. -3-

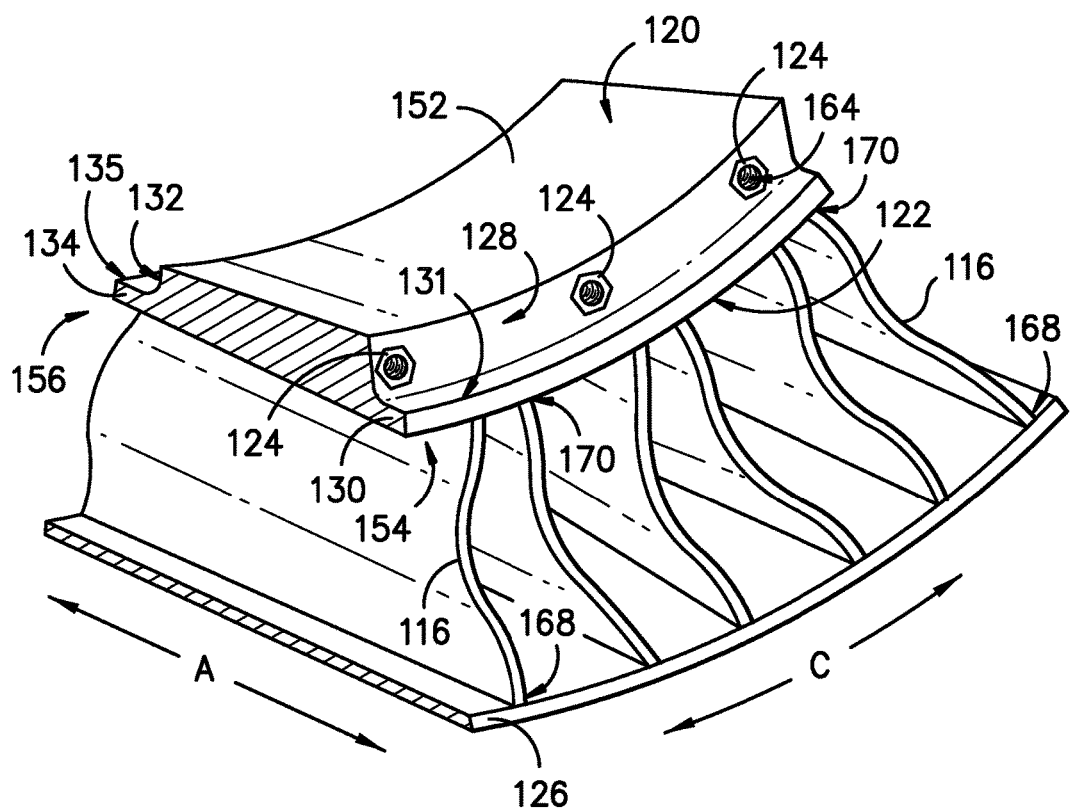
FIG. -4-

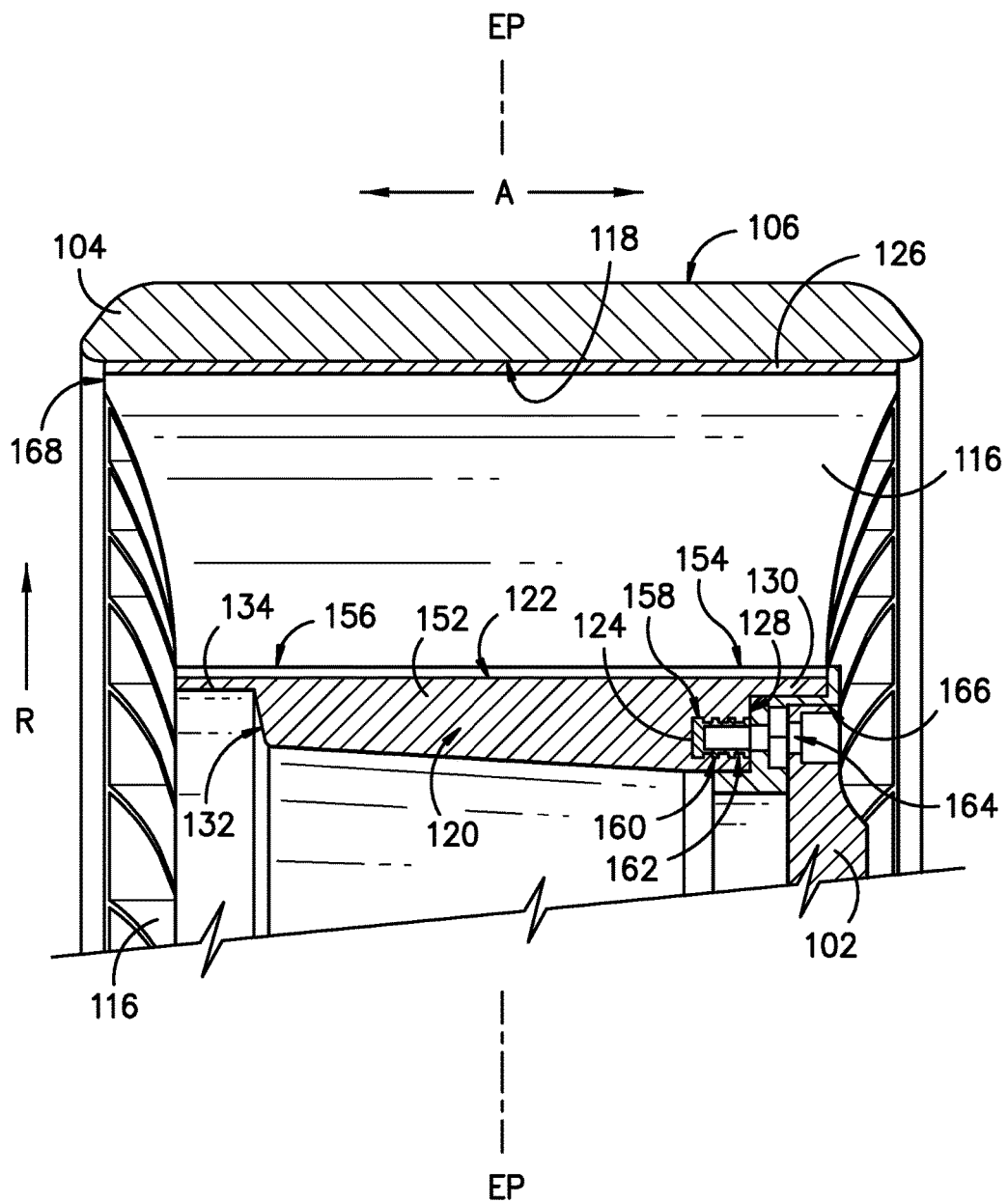
FIG. -5-

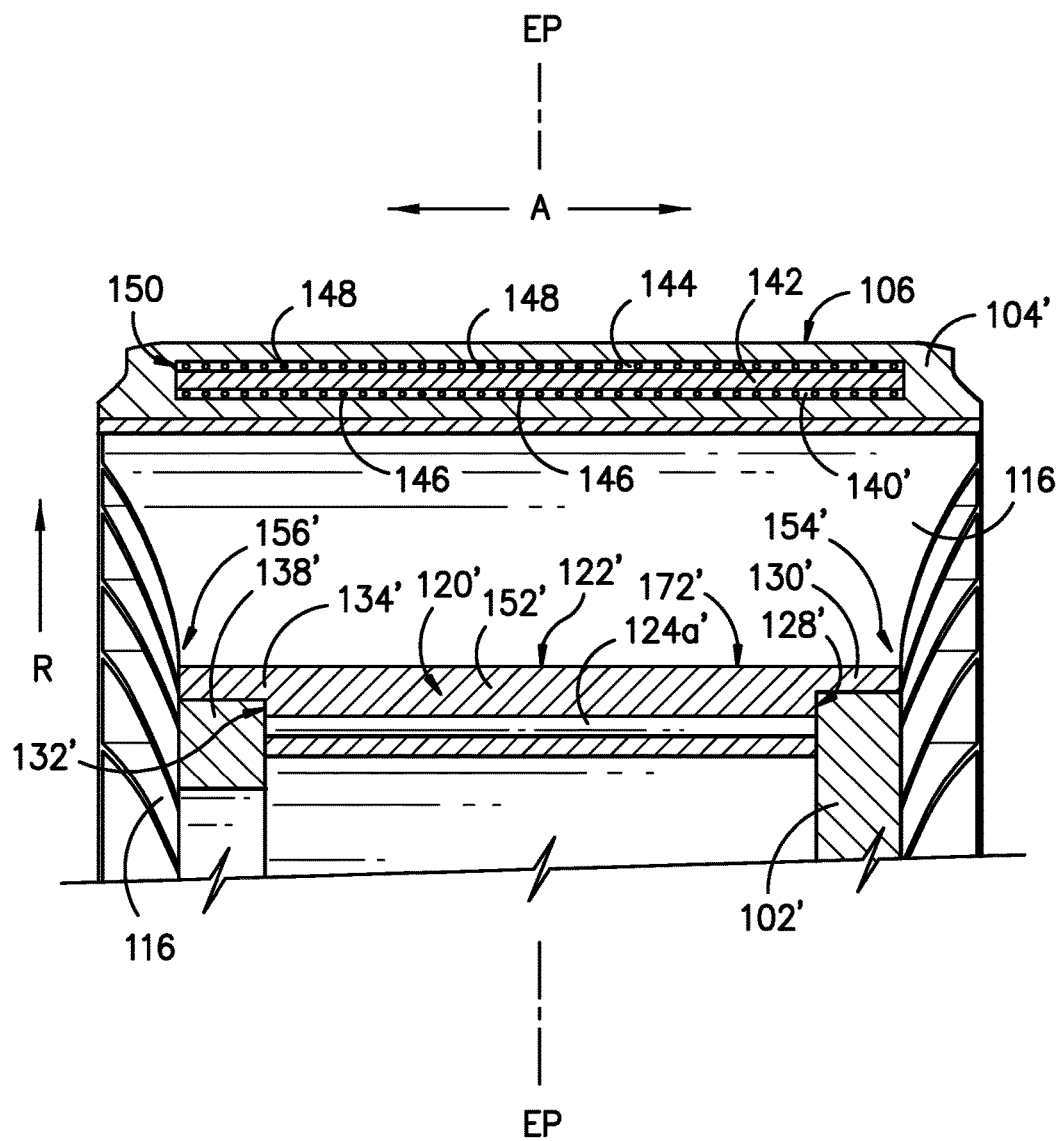
FIG. -6-

NON-PNEUMATIC TIRE WITH INTEGRATED POLYMERIC FLEXIBLE WHEEL CENTER MOUNT

PRIORITY STATEMENT

The present application claims priority to PCT/US14/070812, filed Dec. 17, 2014 in the United States Receiving Office.

FIELD OF THE INVENTION

The subject matter of the present disclosure relates generally to a structurally supported, non-pneumatic wheel.

BACKGROUND OF THE INVENTION

The pneumatic tire is a known solution for compliance, comfort, mass, and rolling resistance. The pneumatic tire has disadvantages, however, in complexity, the need for maintenance, and susceptibility to damage. A device that improves on pneumatic tire performance could, for example, provide more compliance, better control of stiffness, lower maintenance requirements, and resistance to damage.

Conventional solid tires, spring tires, and cushion tires, although lacking the need for maintenance and the susceptibility to damage of pneumatic tires, unfortunately lack its performance advantages. In particular, solid and cushion tires typically include a solid rim surrounded by a resilient material layer. These tires rely on compression of the ground-contacting portion of the resilient layer directly under the load for load support. These types of tires can be heavy and stiff and lack the shock absorbing capability of pneumatic tires.

Other non-pneumatic constructions and their benefits are described in e.g., U.S. Pat. Nos. 6,769,465; 6,994,134; 7,013,939; and 7,201,194. Some non-pneumatic tire constructions propose incorporating a shear band, embodiments of which are described in e.g., U.S. Pat. Nos. 6,769,465 and 7,201,194, which are incorporated herein by reference. Such non-pneumatic tires provide advantages in tire performance without relying upon a gas inflation pressure for support of the loads applied to the tire.

In one example of a non-pneumatic tire, a compliant band with a ground contacting portion can be connected with a plurality of web elements extending radially from a center element or hub. The hub is constructed of metal, which must be machined or cast. Unfortunately, the hub can be a substantial part of the overall cost of the non-pneumatic tire.

In addition, the metal hub can present certain performance problems. For example, in the operation of both pneumatic and non-pneumatic tires, the tire may experience an impact event that can cause permanent damage. Such an event may occur when e.g., the tire encounters a curb or other large obstacle at an excessive speed. For the non-pneumatic construction as described above, the metal hub may be permanently deformed. In turn, such deformation can cause a noticeable first harmonic non-uniformity that can be sensed by the driver of the vehicle.

The metal hub can also be susceptible to transmitting vibrations that generate undesirable noises both inside and outside of the vehicle. The high modulus of the metal structure may more readily transmit vibrations caused by factors such as e.g., asperities in the road or vibrations generated by certain components of the tire during operation.

Accordingly, a non-pneumatic tire with an improved construction would be useful. More particularly, a non-pneumatic tire that can reduce the cost of construction would be beneficial. A non-pneumatic tire that can reduce or eliminate the susceptibility to certain permanent deformations from an impact event would be advantageous. A non-pneumatic tire that can reduce or eliminate the transmission of certain undesirable vibrations to the vehicle and/or otherwise reduce noise generation would also be useful.

SUMMARY OF THE INVENTION

The present invention provides a structurally supported non-pneumatic wheel. The wheel includes a hub constructed from a polymeric material, which can more readily resist permanent deformation from an impact event. The non-metal construction for the hub also helps minimize the undesirable transmission of vibrations to the vehicle and the generation of noise. By avoiding the manufacture of a metallic hub, savings can be realized in the costs of manufacture of the wheel. Additional objects and advantages of the invention will be set forth in part in the following description, or may be apparent from the description, or may be learned through practice of the invention.

In one exemplary embodiment, the present invention provides a structurally supported, non-pneumatic wheel defining axial, radial, and circumferential directions. The wheel includes a hub having a cylindrical portion extending along the axial direction between a first end and a second end. The hub defines a mounting surface at the first end of the cylindrical portion. The hub is constructed from a polymeric material. A plurality of fastener inserts are positioned in the hub at the mounting surface. The fastener inserts are spaced apart from each other along the circumferential direction. A compliant, load supporting band is positioned radially outward and concentrically with the hub. A plurality of tension-transmitting web elements extend between the hub and the load supporting band.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of an exemplary embodiment of a non-pneumatic wheel of the present invention.

FIG. 2 illustrates a perspective view of an exemplary sub-assembly of the embodiment of FIG. 1.

FIG. 3 is a perspective view of an exemplary sub-assembly of the embodiment of FIG. 1.

FIG. 4 provides a perspective view of a portion of an exemplary non-pneumatic wheel of the present invention.

FIG. 5 is a partial cross-sectional view of the exemplary embodiment of FIG. 1 as viewed along a meridian plane.

FIG. 6 is partial cross-sectional view of another exemplary embodiment of a non-pneumatic wheel of the present invention as viewed along a meridian plane.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As used herein, the following definitions apply:

"Meridian plane" is a plane within which lies the axis of rotation of the wheel. FIGS. 5 and 6, for example, are partial cross-sections of an exemplary non-pneumatic wheel 100 of the present invention taken along a meridian plane.

"Equatorial plane" or "EP" is a plane perpendicular to the meridian plane that bisects the tire along its center line.

The "radial direction" or "R" is perpendicular to the axis of rotation of the wheel.

The "circumferential direction" or "C" follows the circumference of the wheel.

FIG. 1 provides a perspective view of an exemplary embodiment of a structurally supported, non-pneumatic wheel 100 shown in an assembled state before mounting onto e.g., a vehicle. FIG. 2 is a perspective view of a subassembly 96 of wheel 100 while FIG. 3 is a perspective view of an exemplary polymeric hub 120 of non-pneumatic wheel 100. The present invention is not limited to the particular shape, size, or appearance shown in the figures. As will be understood using the teachings disclosed herein, wheels of other shapes, sizes, and appearances may be used as well.

Non-pneumatic wheel 100 includes centrally-located wheel center 102 that can be used to connect wheel 100 to a vehicle (In FIG. 3, wheel center 102 has been removed). For example, openings 112 are provided for insertion of bolts or other fastening devices to secure wheel 100 to a vehicle. A plurality of spokes 108 extend between a center portion 98 and a mounting ring 110. Mounting ring 110 is provided with a plurality of openings 114 through which fasteners 94 may be inserted into fastener inserts 124 (FIG. 3) so as to secure wheel center 102 to a hub 120. For this exemplary embodiment, fasteners 94, openings 114, and fastener inserts 124 are uniformly spaced about mounting ring 110. Wheel center 102 may be constructed e.g., of metal and provided with various aesthetic features. Other materials may be used as well.

As shown in FIG. 1, non-pneumatic wheel 100 include a compliant, load supporting band 104 that is positioned radially outward of polymeric hub 120 and positioned concentrically with hub 120. A tread 106 may be formed on, or provided as part of, load supporting band 104. For example, a tread band may be adhered to load supporting band 104. A plurality of tension-transmitting web elements 116 extend along the radial direction between hub 120 and load supporting band 104. Web elements 116 may have other shapes and configurations from what is shown in FIG. 1.

By way of example, load supporting band 104 may include a shear band 150 as shown in the partial cross-sectional view of FIG. 6 taken along a meridian plane of non-pneumatic wheel 100. For this exemplary embodiment, shear band 150 includes an inner reinforcing band 140, and outer reinforcing band 144, and a shear layer 142 positioned therebetween. Shear layer 142 may be constructed e.g. of an elastomeric material such as e.g., natural and synthetic rubbers, polyurethanes, foamed rubbers and polyurethanes, segmented copolyesters, and block co-polymers of nylon. Reinforcing bands 140 and 144 may include reinforcements 146 and 148, respectively, constructed from e.g., essentially inextensible cord reinforcements embedded in an elastomeric coating. Such reinforcements may include e.g., any of several materials suitable for use as tire belt reinforcements in conventional tires such as monofilaments or cords of steel, aramid or other high modulus textiles. Other constructions and materials may be used as well.

Returning to FIG. 1, compliant band 104 supports loads transmitted to non-pneumatic wheel or tire 100 when e.g., wheel center 102 is mounted onto a vehicle. More particularly, a load transmitted through wheel center 102 is transmitted by tension through web spokes 116 to compliant band 104. In turn, the annular compliant band 104 acts in a manner similar to an arch and provides a circumferential compression stiffness and a longitudinal bending stiffness in the tire equatorial plane EP sufficiently high to act as a load-supporting member. Under load, the compliant band 104 deforms over a contact area with the ground surface through a mechanism including shear deformation of compliant band 104. The ability to deform with shear provides a compliant ground contact area that acts similar to that of a pneumatic tire, with similar advantageous results.

Hub 120 is constructed from a polymeric material. The polymeric material in the present embodiment may be any suitable polymeric material such as e.g., a natural or synthetic rubber, polyurethane, foamed rubber and foamed polyurethane, segmented copolyesters, and block co-polymers of nylon. The use of a polymeric material provides several advantages. For example, as opposed to a metallic construction, the polymeric material used for hub 120 can reduce the transmission of undesirable vibrations to an attached vehicle. Additionally, the generation of undesirable noises associated with a metal hub can be minimized or avoided. Savings in the costs of manufacture can also be achieved by avoiding the use of metal in forming hub 120.

Several different exemplary embodiments may be used for polymeric hub 120. Referring now to FIGS. 3, 4, and 5, for this exemplary embodiment hub 120 includes a cylindrical portion 152 that extends along axial direction A between a first end 154 and a second end 156. As best shown in FIGS. 4 and 5, cylindrical portion 152 has a taper or, more particularly, the radial thickness of cylindrical portion 152 decreases from first end 154 to second end 156 along axial direction A.

Hub 120 defines a mounting surface 128 near first end 154 for the receipt of wheel center 102. For this embodiment, mounting surface 128 is substantially parallel (e.g., within ±5 degrees) to radial direction R. As shown, fastener inserts 124 extend along axial direction A through mounting surface 128 and into the cylindrical portion 152 of polymeric hub 120. Outside surface 158 of exemplary fastener insert 124 is provide with a plurality of engagement elements shown here as ribs 160 and grooves 162 that secure fastener insert 124 in the polymeric material used to make hub 120. Fastener inserts 124 may be e.g., placed into the mold when hub 120 is formed.

In this exemplary embodiment, fastener inserts 124 include a threaded opening 164 for complementary receipt of fasteners 94. Other configurations may be used for fastener inserts 124 as well. For example, fastener inserts 124 may be configured as threaded lugs extending along axial direction A for insertion through openings 114 in wheel center 102 and securement with a nut torqued onto each lug. As will be understood by one of skill in the art using the teachings disclosed herein, a variety of configurations may be used for fastener inserts 124 in order to secure wheel center 102. Such fastener inserts may e.g., extend partially or completely through hub 120 and may include other features for securing the position of fastener inserts in hub 120.

Continuing with FIGS. 4 and 5, hub 120 defines a shelf 130 at first end 154. Shelf 130 projects outwardly along axial direction A from first end 154 past mounting surface 128 and provides a surface facing radially inward towards the axis of rotation of wheel 100. As such, shelf 130 forms a notch or groove for receipt of the outer circumferential edge 166 (FIGS. 1 and 5) of wheel center 102.

Hub 120 may also define an additional shelf 134 at second end 156. Shelf 134 projects outwardly along axial direction A from second end 156 past mounting surface 132 and provides a surface facing radially inward towards the axis of rotation of wheel 100. Similar to shelf 130, shelf 134 forms a notch or groove into which e.g., a ring or other device may be received as will be further described.

For this exemplary embodiment, the compliant band 104 of non-pneumatic wheel 100 defines a radially inner surface 118 (FIG. 5). An outer interface structure 126 is attached to the radially outer ends 168 of web elements 116 and to radially inner surface 118. The radially inner ends 170 of web elements 116 are attached directly to the cylindrical portion 152 of hub 120. In one exemplary aspect of the present invention, outer interface structure 126 is integrally formed with web elements 116 and may also be integrally formed with hub 120. For example, outer interface structure 126, web elements 116, and hub 120 may be cast together in the same mold. In other embodiments of the invention, one or more such elements may be formed separately.

FIG. 6 provides a partial cross-sectional view of another exemplary embodiment of a structurally supported, non-pneumatic wheel 100' with compliant band 104', shelf 130', shelf 134'. For this exemplary embodiment, non-pneumatic wheel 100' includes a fastening insert in the form of a pin 124a' that extends through mounting surface 128', axially through cylindrical portion 152' of hub 120', and through additional mounting surface 132'. Pin 124a' connects wheel center 102' positioned at first end 154' with a ring 138' positioned at second end 156' to secure wheel center 102' onto hub 120'. As shown, in this exemplary embodiment, cylindrical portion 152' does not taper or change thickness along axial direction A.

The exemplary hub 120' of FIG. 6 includes an inner interface structure 172' positioned on radially outer mounting surface 122'. Inner interface structure 172' is attached to the radially inner ends 170 of web elements 116 and to radially outer mounting surface 122'. In one exemplary aspect of the present invention, inner interface structure 172' is integrally formed with web elements 116 and may also be integrally formed with hub 120'. For example, inner interface structure 172', web elements 116, and hub 120' may be cast together in the same mold. In other embodiments of the invention, one or more such elements may be formed separately.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A structurally supported, non-pneumatic wheel defining axial; radial, and circumferential directions, the wheel comprising:
a hub comprising a cylindrical portion extending along the axial direction between a first end and a second end, the hub defining a mounting surface at the first end of the cylindrical portion, the hub defining a shelf that projects outwardly along the axial direction from the first end and past the mounting surface, the shelf and mounting surface forming a notch extending along the circumferential direction, the hub comprising a polymeric material;
a plurality of fastener inserts positioned in the hub at the mounting surface, the fastener inserts spaced apart from each other along the circumferential direction;
a compliant, load supporting band positioned radially outward and concentrically with the hub; and
a plurality of tension-transmitting web elements extending between the hub and the load supporting band, each of the tension-transmitting elements having a radially inner end attached to the cylindrical portion of the hub and extending between the first end and the second end of the cylindrical portion.

2. The structurally supported, non-pneumatic wheel of claim 1, wherein the inserts are equally spaced about the circumferential direction.

3. The structurally supported, non-pneumatic wheel of claim 1, wherein each insert defines an opening for complementary receipt of a fastening device.

4. The structurally supported, non-pneumatic wheel of claim 1, wherein each insert comprises an outer surface defining one or more engagement elements for connecting each insert with the hub.

5. The structurally supported, non-pneumatic wheel of claim 1, wherein each insert comprises an outer surface defining one or more ribs and grooves for connecting each insert with the hub.

6. The structurally supported, non-pneumatic wheel of claim 1, wherein the hub comprises a radially outer surface along the cylindrical portion, and wherein the non-pneumatic wheel further comprises an inner interface structure attached to the radially outer surface of the cylindrical portion, the inner interface structure extending circumferentially around the hub and connected with the tension-transmitting web elements.

7. The structurally supported, non-pneumatic wheel of claim 6, wherein the inner interface structure is integrally formed with the hub.

8. The structurally supported, non-pneumatic wheel of claim 6, wherein the load supporting band comprises a radially inner surface, and wherein the non-pneumatic wheel further comprises an outer interface structure attached to the radially inner surface of the load supporting band.

9. The structurally supported, non-pneumatic wheel of claim 8 wherein the outer interface structure is integrally formed with the hub.

10. The structurally supported, non-pneumatic wheel of claim 1, wherein the cylindrical portion has a radial thickness that decreases along a direction from the first end to the second end.

11. The structurally supported, non-pneumatic wheel of claim 1, wherein the mounting surface is substantially parallel to the radial direction.

12. The structurally supported, non-pneumatic wheel of claim 1, wherein the shelf provides a surface facing radially inward towards an axis of rotation of the non-pneumatic wheel.

13. The structurally supported, non-pneumatic wheel of claim 12, wherein the hub defines an additional mounting surface at the second end of the cylindrical portion.

14. The structurally supported, non-pneumatic wheel of claim 12, wherein the hub comprises an additional shelf projecting outwardly along the axial direction from the second end and projecting past the mounting surface on the second end.

15. The structurally supported, non-pneumatic wheel of claim 1, wherein the fastening insert comprises a plurality of pins, each pin extending along an axial direction through the hub between the first end and the second end of the cylindrical portion.

16. The structurally supported, non-pneumatic wheel of claim 15, further comprising
a wheel center positioned on the mounting surface and attached to the pins near the first end of the cylindrical portion;
a ring positioned on the second end of the cylindrical portion and attached to the pins near the second end of the cylindrical portion.

17. The structurally supported, non-pneumatic wheel of claim 1, wherein the load supporting band further comprises
an outer reinforcing band;
an inner reinforcing band; and
a shear layer positioned between the outer reinforcing band and the inner reinforcing band.

* * * * *